United States Patent [19]

Postle et al.

[11] Patent Number: 4,489,108
[45] Date of Patent: Dec. 18, 1984

[54] PHOTOCHROMIC ASSEMBLY AND MANUFACTURE OF THIS ASSEMBLY

[75] Inventors: Stephen R. Postle, Brentwood; Samuel B. Kingston, Doddinghurst, both of England

[73] Assignee: Ciba-Geigy AG, Basel, Switzerland

[21] Appl. No.: 471,554

[22] Filed: Mar. 2, 1983

[30] Foreign Application Priority Data

Mar. 11, 1982 [GB] United Kingdom ............... 8207067

[51] Int. Cl.$^3$ .................... B32B 3/00; B32B 15/00
[52] U.S. Cl. ................................ 427/164; 427/160
[58] Field of Search ............................... 427/160, 164

[56] References Cited

U.S. PATENT DOCUMENTS 4,049,846  9/1977  Hovey ................................. 427/164

Primary Examiner—Shrive P. Beck
Attorney, Agent, or Firm—Joseph G. Kolodny

[57] ABSTRACT

A photochromic assembly is produced by coating onto a self-supporting flexible plastics material a polymer latex comprising from 10 to 40% by weight of the total solids of the latex photochromic glass beads from 0.05 $\mu$m to 50 $\mu$m in size.

8 Claims, No Drawings

PHOTOCHROMIC ASSEMBLY AND MANUFACTURE OF THIS ASSEMBLY

This invention relates to a process for the manufacture of a photochromic assembly.

Photochromic glass is well known material which darkens when exposed to light but lightens again when the strength of the light is diminished. This material is of particular use in sun glasses but in general because of its cost it has not found wide use as window glass.

Photochromic glass as used in sun glasses comprises sheet glass in which is dispersed a photochromic system. The most usual photochromic system is silver halide but other useful halides in this respect are copper halide and cadmium halide. Certain organic chemicals are known for example spiropyran derivatives but these do not seem to have found use in photochromic glass.

We have found sheet photochromic material which is thinner and more flexible than the previously known sheets of photochromic glass.

According to one object of the present invention there is provided a process for the production of a photochromic assembly which comprises:

(a) coating onto a self-supporting flexible plastics material a polymer latex which comprises from 10% to 40% by weight of the total solids of the latex photochromic glass beads from 0.05 μm to 50 μm in size, the polymer latex having been prepared by emulsion polymerising a monomer or monomer mixture which consists of:

a monomer which is an alkyl acrylate or an alkyl methacrylate or a monomer mixture comprising both an alkyl acrylate and an alkyl methacrylate or a monomer mixture comprising an alkyl acrylate and/or an alkyl methacrylate together with up to 5% by weight of an ethylenically unsaturated copolymerisable acid and/or up to 30% by weight of other ethylenically unsaturated comonomers in the presence of at least 12% by weight of the monomers present of an anionic surfactant at a temperature of from 15° C. to 90° C. by use of a redox initiator system which is present to the extent of from 0.1 to 3% by weight of the monomers present (b) drying down the coated layer and optionally (c) preparing sheets of the requisite size from the coated material.

Further object of the invention is the photochromic assembly obtained by the inventive process.

The preferred temperature range for the polymerisation reaction is from 60° to 70° C.

The polymer latex produced in the process of the present invention has an average particle size of less than 0.05 μm as determined by hydrodynamic chromatography. This technique is described for example by H. Small in J. Colloid and Interface Science, Vol. 48, 147 (1974) and H. Small, F. L. Saunders and J. Bale in Advances in Colloid and Interface Science, Vol. 6, 237 (1976).

It is an essential feature in the process for the production of the inventively used polymer latex that the total amount of surfactant used is at least 12% by weight of the monomers present. If less is used, as in the process described in GB No. 1.333.663, the average particle size of the copolymers in the latex is significantly greater as shown in the Example 1 in relation to copolymer latex 5. The preferred amount of surfactant to be present during the polymerisation reaction is from 15 to 20% by weight of the monomers present.

Particularly suitable anionic surfactants for use in the process of the present invention are sulphosuccinate compounds, for example disodium ethoxylated nonyl phenol half ester of sulphosuccinic acid, tetrasodium N-(1,2-dicarboxyethyl)-N-octadecylsulphosuccinamate, or mixtures of any of these or other sulphosuccinate surfactants with other common anionic surfactants.

Other useful anionic surfactants are sulphated or sulphonated polyethylene oxide compounds.

Examples of suitable monomers for use in the process are methyl acrylate, methyl methacrylate, butyl methacrylate, 2-ethylhexyl acrylate and butyl acrylate.

Where the monomer mixture contains other ethylenically unsaturated monomers, then those monomers may be selected from for example styrene acrylonitrile, vinylidene chloride or vinyl acetate. Suitable co-monomers are hydroxyethyl acrylate, hydroxyethyl methacrylate and, hydroxypropyl methacrylate. It is however an important feature of the process that if co-monomers such as acrylic acid, methacrylic acid or other polymerisable acids are used, their proportion of the total monomer content should not exceed 5%, otherwise a substantial increase in particle size is observed.

The preferred redox initiator system for use in the process of the present invention is the sodium or potassium persulphate/sodium metabisulphite system. Most preferably the monomers and the metabisulphite are emulsified with some of the surfactant, then added dropwise to the reaction vessel which is maintained preferably at between 60° and 70° C., and contains persulphate and the remainder of the surfactant.

Optionally a chain transfer reagent, for example isopropanol, may be present either in the pre-emulsified monomer mixture or present in the reaction vessel initially.

The solids content of the polymer latex prepared in the present invention can be varied, but most usefully the amount of polymer present in the latex is within the range of 30 to 40% by weight of the total weight of the latex.

In the process of the present invention the photochromic glass beads form a hetero-dispersed phase in the latex. However as the size of the polymer particles as prepared in the process of the present invention is less than 0.05 μm any difference in refractive indices between the photochromic glass beads and the polymer particles is of no significance and when the coated layer is dried it remains essentially transparent. However when the polymer latex is prepared by a method which yields polymer particles greater than 0.05 μm the heterodispersed phase of the glass particles in the polymer latex causes a milkiness in the latex and this milkiness is present in the dried coated layer.

Preferred flexible plastics material sheets are those used as a photographic film base. Examples of plastics material used as film base include cellulose triacetate, cellulose acetate-butyrate and biaxially oriented polyethylene terephthalate, polycarbonate and polystyrene. To enable a hydrophilic layer such as a polymer latex to adhere to biaxially oriented polystyrene, polyethylene therephthalate and polycarbonate the surface of these plastics material usually require to be treated and a subbing layer coated therein.

Other suitable plastics material, for use as the flexible sheet include polypropylene, polyvinylchloride and polyamide.

Preferably, there is coated in the surface of the dried polymer layer which comprises the photochromic glass beads a thin protective layer for example a gelatin, polyvinyl alcohol or methyl cellulose layer.

Optionally there may be coated on the reverse side of the flexible sheet an adhesive layer. Suitable adhesive layers are solvent-based adhesive layers for example polyacrylate or polybutadiene layers. However water-based adhesives such as starch, silicates can also be used. To get such layers to adhere to the flexible sheet surface treatment of the sheet and/or a subbing layer may be required as described above for some of the plastics material. Alternatively a charged layer may be coated on the reverse side of the flexible sheet, for example gelatin and an ionic wetting agent, which layer has been treated with a corona discharge. Charged layers of this type strongly retain an electrostatic charge and can be firmly adfixed to a flat surface for example to a plate glass surface.

The glass beads preferably contain as the photochromic system a metal halide such as silver halide, preferably silver bromide. The glass beads may be prepared by grinding up photochromic glass sheets of the type described for example in U.S. Pat. No. 3,208,860 and GB Nos. 1,111,977; 1,410,203; 1,428,736; 1,498,769; 1,505,100 and 1,518,497.

There may be present in the dried polymer layer of the assembly dyes, optical brighteners, anti-oxidants, light stabilisers, ultra-violet (u.v.)-absorbers, infrared (i.r)-absorbers and binder modifiers such as latexes and hardeners. Further the surface of the assembly may be treated with an antiblock substance or a surfactant. The surface may be protected by a further layer of colloid material, or a laminate for example a polyethylene laminate.

The photochromic assembly of the present invention may exhibit slow photochemical reversal allowing non-destructive read-out at wavelengths below 600 nm.

When the proportion of photochromic material present in the binder is from 10 to 20% by weight of the binder the layer is light transparent. When however the proportion of photochromic material is from 20 to 40% and especially from 30 to 40% by weight the layer is opaque.

The uses of the assembly of the invention are as follows:

(1) for an opaque or semi-opaque assembly: temporary reusable print material for use in microplanning, microfilm copying, graphic arts material where the copy can be examined and information extracted. A permanent copy then can be made in a normal photographic way from a negative, or the temporary print may be copied e.g. xerographically.

(2) for a transparent or translucent assembly: Window covering expecially with adhesive or electrostatic backing, for office and domestic window, car windscreens, spectacle coverings, greenhouses, to control u.v.-radiation and glare;

(b) Masking material to enhance print contrast when used as in U.S. Pat. No. 4,021,191 or as in Phot-Sci.Eng. 1965, Vol. 9, 67–71, or by carrying a preformed and semi-stable image, as a contrast reducing aid in a positive-positive print system for example a silver dye bleach system;

(c) Reversable microfilm or similar film for recording CRO (cathode ray oscilloscope) output or COM (computer output material) where permanent storage of such output may not be vital: a copy of the data stored on the temporary film would then be available for permanent copying onto another film.

The following example will serve to illustrate the invention.

EXAMPLE

Preparation of Photochromic glass particles 32 g of a lump of photochromic glass containing silver bromide as the photochromic system (prepared according GB No. 1.111.977) is dry ground in a pestle and mortar, until the majority can be sieved through a 2 mm mesh. In this way 30 g of the glass powder is sieved into a 250 ml stainless steel pot which is filled to 75% of its volume with 10 mm stainless steel balls, sealed, and rolled on a roller mill for 10 hours. The powdered glass is then washed off the balls with 60 ml of water which contained an alkyl naphthalene sodium sulphonate wetting agent at 0.1% concentration. Further water is added to give a total dispersion of 100 g. This is milled in a bead mill (Dyno Mill: Glen Creston) using 1.0–1.5 mm glass beads at a rate of 3000 r.p.m. for 2 hours. This gives a dispersion of mean particle size 2 μm, and a polydispersity of 4 (as measured on a Nanosizer: Coulter Instruments) and containing 30% solids.

General polymerisation procedure

Water, sodium persulphate and a portion of the surfactant are added to the reation vessel which is purged with nitrogen, and the temperature raised to 60° C. A preemulsified monomer mixture is prepared by mixing monomers, water, sodium metabisulphite and the remainder of the surfactant using a mechanical stirrer. This preemulsified mixture is added protionwise to the reaction vessel using a metering pump over the course of approximately one hour. The reaction mixture is maintained under nitrogen atmosphere at approximately 65° C. during the addition. At the end of the addition the mixture is stirred for a further two hours at 65° C. before adding a further portion of persulphate and metabilsulphite. The mixture is allowed to cool to room temperature with continued stirring before filtering through muslin and bottling up.

Surfactants of the following formulae are used in this Example:

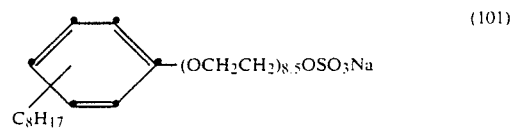

(101)

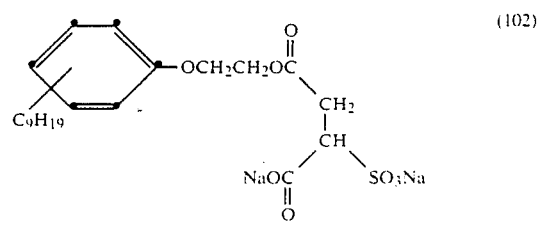

(102)

-continued

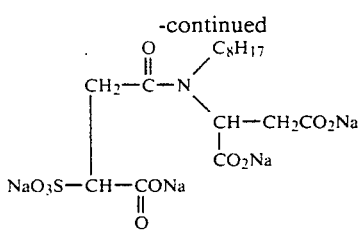

The following abbreviations are used in this Example: BA=butyl acrylate; HPMA=2-hydroxypropyl methacrylate; MMA=methyl methacrylate; SMBS=sodium metabisulphite; SPS=sodium persulphite; PE=pre-emulsified; IP=in pot.

Copolymer Latex 1

PE: BA 96 ml; MMA 74 ml; HEMA 33 ml; compound (102) 36 ml; compound (101) 30 ml; SMBS 0.6 g; Water 134 ml IP: Water 140 ml;/compound (102) 60 ml; SPS 1.2 g. Average particle size: 0.040 μm.

Copolymer Latex 2

PE: BA 225 ml; MMA 175 ml; HPMA 50 ml; compound (102) 75 ml; SMBS 0.8 g; Water 400 ml.

IP: Water 200 ml; compound (103) 75 ml; SPS 1.6 g. Average particle size: 0.048 μm.

Copolymer Latex 3

PE: BA 140 ml; HPMA 60 ml; compound (102) 60 ml; Water 140 ml; SMBS 0.6 g.

IP: Water 140 ml; compound (102) 60 ml; SPS 1.2 g. Average particle size: 0.039 μm.

Copolymer Latex 4

PE: BA 117 ml; HPMA 32 ml; compound (102) 50 ml; Water 75 ml; SMBS 0.4 g.

IP: Water 150 ml; compound (102) 50 ml; SPS 0.8 g Average particle size: 0.033 μm.

Copolymer Latex 5

Comparative latex

This latex comprises only 3% of surfactant.

PE: BA 235 ml; HPMA 65 ml; compound (102) 17 ml; Water 223 ml; SMBS 0.8 g

IP: Water 200 ml; compound (102) 10 ml; SPS 1.6 g Average particle size: 0.092 μm.

This example shows that all the copolymer latexes prepared by the inventively used process have an average particle size of less than 0.05 μm. However the comparative copolymer latex (5) the preparation of which comprises less surfactant, has a much larger average particle size.

Samples of the aqueous dispersion of the photochromic glass beads as just prepared containing 21.5% solids are added to each of the five copolymer latexes as just prepared to yield latexes which comprises 15% by weight of photochromic glass beads and 30% by weight of polymer particles.

Each of the five latexes containing the dispersed glass beads are then coated on sheets of cellulose triacetate film base. The coated layers are dried to prepare photochromic assemblies. Each of the five assemblies are inspected, the assemblies which comprise copolymer latexes 1, 2, 3 and 4 are all essentially transparent. However the assembly which comprises copolymer latex 5 is distinctly milky in appearance.

The photochromaticity of the coated sheets is demonstrated by half covering each sheet with opaque material and exposing the whole of each sheet for 360 seconds to a 30 watt u.v.-lamp emitting light at 366 nm. In the cases of the sheets which comprise copolymer latexes 1, 2, 3 and 4 the portion of the sheets not covered by the opaque material is noticeably darker than the remainder of each of the four sheets. On leaving the four sheets under ambient daylight conditions, each sheet adopts a uniform density after 30 minutes. This demonstrates the reversability of the system. However in the case of the sheet which comprises copolymer (5) the milkiness of the coating precludes a noticeable darkening of the non-covered part of the sheet when exposed to the u.v.-lamp.

We claim:

1. A process for the production of a photochromic assembly which comprises
   (a) coating onto a self-supporting flexible plastic material a polymer latex which comprises from 10% to 40% by weight of the total solids of the latex photochromic glass beads from 0.05 μm to 50 μm in size the polymer latex having been prepared by emulsion polymerising
      a monomer or monomer mixture which consists of
         a monomer which is an alkyl acrylate or an alkyl methacrylate or
         a monomer mixture comprising both an alkyl acrylate and an alkyl methacrylate or
         a monomer mixture comprising an alkyl acrylate and/or an alkyl methacrylate together with up to 5% by weight of an ethylenically unsaturated copolymerisable acid and/or up to 30% by weight of other ethylenically unsaturated comonomers
      in the presence of at least 12% by weight of the monomers present of an anionic surfactant at a temperature of from 15° C. to 90° C. by use of a redox initiator system which is present to the extent of from 0.1 to 3% by weight of the monomers present,
   and (b) drying the coated layer.

2. A process according to claim 1 wherein the temperature range for the polymerisation reaction is from 60° to 70° C.

3. A process according to claim 1 wherein the amount of anionic surfactant present during the polymerisation reaction is from 15 to 20% by weight of the monomers present.

4. A process according to claim 3 wherein the anionic surfactant is a sulphosuccinate compound used either alone or in admixture with other anionic surfactants.

5. A process according to claim 1 wherein the alkyl acrylate or alkyl methacrylate is methyl acrylate, methyl methacrylate, butyl methacrylate, 2-ethylhexyl acrylate or butyl acrylate.

6. A process according to claim 1 wherein the redox initiator system is a sodium or potassium persulphate/sodium metabisulphite system.

7. A process according to claim 1 wherein the solids content of the polymer latex prepared is from 30 to 40% by weight of the total weight of the latex.

8. A process according to claim 1 wherein sheets of the requisite size are prepared from the coated material.

* * * * *